(12) United States Patent
Dudr et al.

(10) Patent No.: US 9,387,419 B2
(45) Date of Patent: Jul. 12, 2016

(54) METHOD AND DEVICE FOR MANUFACTURING A FILTER ELEMENT AND FILTER ELEMENT

(71) Applicant: MANN+HUMMEL GMBH, Ludwigsburg (DE)

(72) Inventors: Karel Dudr, Trebic (CZ); Marek Brychta, Trebic (CZ); Zdenek Netolicka, Pribyslavice (CZ)

(73) Assignee: MANN+HUMMEL GMBH, Ludwigsburg (DE)

( * ) Notice: Subject to any disclaimer, the term of this patent is extended or adjusted under 35 U.S.C. 154(b) by 49 days.

(21) Appl. No.: 14/209,539

(22) Filed: Mar. 13, 2014

(65) Prior Publication Data

US 2014/0260146 A1    Sep. 18, 2014

(30) Foreign Application Priority Data

Mar. 13, 2013    (DE) .......................... 10 2013 004 283

(51) Int. Cl.
| | |
|---|---|
| *B01D 29/00* | (2006.01) |
| *B01D 46/00* | (2006.01) |
| *B26D 7/27* | (2006.01) |
| *B26F 1/00* | (2006.01) |
| *B01D 29/11* | (2006.01) |
| *B26D 1/18* | (2006.01) |
| *B26D 1/24* | (2006.01) |

(52) U.S. Cl.
CPC .......... *B01D 29/0093* (2013.01); *B01D 29/111* (2013.01); *B01D 46/0001* (2013.01); *B26D 1/185* (2013.01); *B26D 1/245* (2013.01); *B26D 7/27* (2013.01); *B26F 1/00* (2013.01)

(58) Field of Classification Search
CPC .. B01D 39/163; B01D 46/0001; B01D 39/00; A47L 9/14; B27N 3/04; D04H 1/58; D04H 3/12

USPC .......... 55/DIG. 5; 156/181, 62.2, 180, 273.7, 156/275.5; 264/128, DIG. 48; 427/434.2
See application file for complete search history.

(56) References Cited

U.S. PATENT DOCUMENTS

| | | | |
|---|---|---|---|
| 3,737,361 A | 6/1973 | Obeda | |
| 5,443,606 A * | 8/1995 | Hassenboehler, Jr. ........................ | B01D 39/163 55/486 |
| 6,428,610 B1 * | 8/2002 | Tsai ..................... | B01D 39/163 264/151 |
| 6,454,827 B2 * | 9/2002 | Takagaki ........... | B01D 46/0001 156/167 |

(Continued)

FOREIGN PATENT DOCUMENTS

| | | |
|---|---|---|
| WO | 03076272 A1 | 9/2003 |
| WO | 2010017883 A2 | 2/2010 |

*Primary Examiner* — Duane Smith
*Assistant Examiner* — Minh-Chau Pham
(74) *Attorney, Agent, or Firm* — James Hasselbeck

(57) ABSTRACT

In a method for manufacturing a filter element for filtration of a fluid, a filter medium web is treated along at least one treatment line and the filter medium web is cut along at least one cutting line that is adjacent to the at least one treatment line. An apparatus for performing the method has a combination of at least one treatment device and at least one cutting device. The at least one treatment device has at least one treatment element that treats a filter medium web along at least one treatment line. The at least one cutting device has at least one cutting element that cuts the filter medium web along at least one cutting line. The at least one treatment element and the at least one cutting element, viewed in a movement direction of the filter medium web relative to the apparatus, are arranged staggered relative to each other.

4 Claims, 3 Drawing Sheets

(56) References Cited

U.S. PATENT DOCUMENTS

| | | | |
|---|---|---|---|
| 6,946,012 B1 * | 9/2005 | Miller | B01D 46/0001 156/205 |
| 7,083,722 B2 | 8/2006 | McGaw, Jr. | |
| 7,390,443 B1 * | 6/2008 | Choi | B01D 39/00 264/6 |
| 7,569,090 B2 * | 8/2009 | Nelson | B01D 46/0001 156/210 |
| 7,972,458 B2 * | 7/2011 | Nauta | A47L 9/14 156/180 |
| 8,696,857 B2 | 4/2014 | Mees | |
| 2012/0205044 A1 | 8/2012 | Mees | |

* cited by examiner

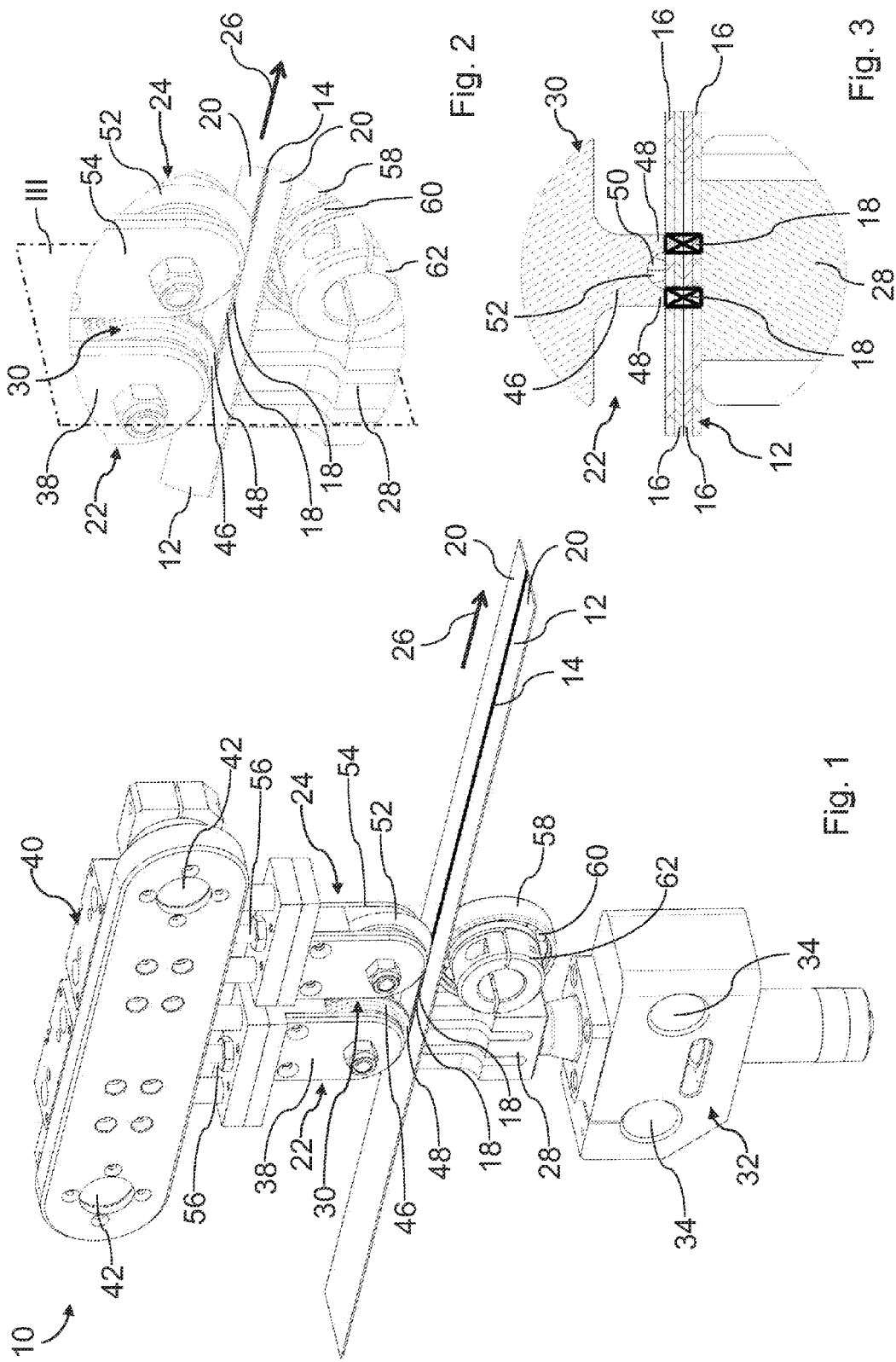

METHOD AND DEVICE FOR MANUFACTURING A FILTER ELEMENT AND FILTER ELEMENT

CROSS-REFERENCE TO RELATED APPLICATION

This application claims the benefit of prior filed German patent application No. 10 2013 004 283.6 filed Mar. 13, 2013, the entire contents of the aforesaid German patent application being incorporated herein by reference

BACKGROUND OF THE INVENTION

The invention concerns a method for manufacturing a filter element for filtration of fluid, in particular air, water, oil, fuel or urea solution, in particular of an internal combustion engine, in particular of a motor vehicle, in which a filter medium web is treated along at least one treatment line and is cut along at least one cutting line.

Moreover, the invention concerns a device for manufacturing a filter element for filtration of fluid, in particular air, water, oil, fuel or urea solution, in particular of an internal combustion engine, in particular of a motor vehicle, in particular for performing the method according to the invention, comprising a treatment device which has at least one treatment element for treating a filter medium web of the filter element along at least one treatment line and comprising at least one cutting device which has at least one cutting element for cutting the filter medium web along at least one cutting line.

Moreover, the invention concerns a filter element for filtration of fluid, in particular air, water, oil, fuel or urea solution, in particular of an internal combustion engine, in particular of a motor vehicle, in particular according to the method according to the invention and/or manufactured with the device according to the invention, comprising a filter medium web which is treated along at least one treatment line and cut along at least one cutting line.

DE 10 2009 054 077 A1 discloses a method for manufacturing a filter element for filtration of fluids. In this context, a multi-layer web of mats is cut at its longitudinal edges. The web of mats is separated to web sections and the web sections are connected to each other at their ends that extend transversely to the longitudinal edges. The web sections are brought into the shape of a tubular filter mat. Before cutting the longitudinal edges along the same, a welding line is formed that seals the layers of the web of mats with each other. Cutting is carried out by a cut which extends within each welding line at a spacing from its two lateral edges.

The invention has the object to design a method and a device for manufacturing a filter element and a filter element of the aforementioned kind in which the at least one treatment line and/or the at least one cutting line, in particular its precision, can be improved.

SUMMARY OF THE INVENTION

This object is solved according to the invention in that the filter medium web is cut adjacent to the at least one treatment line along the at least one cutting line.

According to the invention, cutting of the filter medium web is done outside of the treatment line. In this way, the treatment line is not disturbed or destroyed by the at least one cutting line. Moreover, it must not be taken into account that the at least one treatment line is wide enough for receiving the at least one cutting line. The width of the at least one treatment line can thus be reduced. Advantageously, the at least one cutting line and/or the at least one treatment line can be continuous. In this way, the filter medium web can be separated along the at least one cutting line into the web sections. The at least one cutting line and/or the at least one treatment line can also be interrupted. In this way, a perforation of the filter medium web is possible.

In an advantageous embodiment of the method, the filter medium web can be formed of several layers and the layers of the filter medium web can be connected to each other along the at least one treatment line. Advantageously, the at least one treatment line can be a connecting line along which the filter medium web is appropriately treated for connecting the layers. In this way, the layers can be connected to each other adjacent to an edge of the filter medium web formed by the at least one cutting line. In this way it can be prevented that the layers will fan out at the edges of the filter medium web or the edges of the filter medium web will fray.

In a further advantageous embodiment of the invention, the filter medium web can be welded along the at least one treatment line. For a multi-layer filter medium web, a reliable connection of the layers can be realized by means of a welding process. A single-layer filter medium web can be stabilized and/or bonded by means of a welding process along the at least one treatment line. In this way, it can be prevented that a filter medium that is in particular woven or nonwoven will fray at a cutting edge along the at least one cutting line. Advantageously, the filter medium web can be welded according to an ultrasonic welding process.

Advantageously, the filter medium web can be treated along the at least one treatment line also in a different way mechanically and/or chemically and/or thermally and/or by material fusing. In particular, it can be glued, embossed, stamped or pressed. By means of the treatment, the filter medium web in the area of the at least one treatment line can also be provided with a certain shape and/or a mechanical property.

In a further advantageous embodiment of the method, the filter medium web can be cut between two treatment lines along the at least one cutting line. In this way, a continuous filter medium web can be divided into several web sections. The web sections can be separated from each other along the cutting line. The web sections can be continuous in uncut areas. Adjacent to the at least one cutting line which forms a respective edge of the web sections, the web sections each are treated within one of the treatment lines. In one working step, the edges of both neighboring web sections can be treated in one treatment line, respectively.

In a further advantageous embodiment of the method, the filter medium web can first be treated along the at least one treatment line and subsequently can be cut along the at least one cutting line. This has the advantage that the filter medium web can be fixed by the appropriate treatment along the at least one treatment line. Upon subsequent cutting along the at least one cutting line, the structure of the filter medium web can no longer be influenced in the area of the at least one treatment line. In case of a multi-layer filter medium web, first the layers can be connected to each other and fixed on each other. During cutting, the layers can then no longer be displaced.

The object is further solved by the apparatus according to the invention for manufacturing a filter element in that the at least one treatment element and the at least one cutting element, viewed in a movement direction of the filter medium web relative to the apparatus, are arranged staggered relative to each other.

The advantages and features mentioned above in connection with the method according to the invention and its advantageous embodiments apply likewise to the apparatus according to the invention and its advantageous embodiments, and vice versa. With the staggered arrangement of the at least one cutting element relative to the at least one treatment element, the filter medium web can be cut simply outside of the treatment line.

Advantageously, the treatment device can have at least one welding device, in particular an ultrasonic welding device. Also, a treatment device that operates according to another method, in particular a gluing method, stamping method, embossing method or pressing method, can be provided.

Advantageously, the cutting device can have at least one knife. Also, a cutting device that operates according to another cutting method, in particular according to a laser cutting method, can be provided.

In an advantageous embodiment, the at least one treatment element can be arranged in a functional sequence in front of the at least one cutting element. In this way, the filter medium web, in particular an endless web, can first be treated along the treatment line and subsequently cut in a continuous method.

In a further advantageous embodiment, the at least one treatment element and/or the at least one cutting element can have at least one rotating element, in particular a roller. By means of a rotating element, the filter medium web can be treated and cut simply in particular in accordance with an endless method. Advantageously, the at least one treatment element can have a sonotrode, in particular a rectangular stepped sonotrode, and a rotating anvil as a counter abutment by means of which the filter medium web can be welded in accordance with an ultrasonic welding method. Alternatively, a rotating sonotrode with an appropriate anvil can be provided also. Advantageously, the at least one cutting element can be a disk cutter with which the filter medium web can be simply cut along the at least one cutting line.

In a further advantageous embodiment, the at least one treatment device can have two treatment elements each defining one of the treatment lines and the at least one cutting device can have a cutting element which, viewed transversely to the treatment path, is positioned between the two treatment elements. Advantageously, the treatment device can have two abutments, each defining a welding line, for at least one appropriate welding head, in particular of at least one sonotrode. The two abutments can be advantageously realized as circumferentially extending anvil webs of a rotating anvil. Advantageously, the cutting device can have a disk cutter whose blade is located in the direction of the treatment path between the two treatment elements. Advantageously, the cutting device can be located in the functional sequence behind the two treatment elements. Alternatively, it can also be arranged in the functional sequence adjacent to the two treatment elements. In this way, the filter medium can be simultaneously treated and cut.

In a further advantageous embodiment, a plurality of combinations of treatment devices and cutting devices can be arranged adjacent to each other relative to the treatment path. In this way, several cutting lines and several treatment lines can be realized simultaneously adjacent to each other.

The object is solved furthermore by the filter element according to the invention in that the at least one cutting line is located adjacent to the at least one treatment line.

The advantages and features that have been disclosed in connection with the method according to the invention for manufacturing a filter element and its advantageous embodiments and with the apparatus according to the invention and its advantageous embodiments apply likewise to the filter element according to the invention and its advantageous embodiments. In this way, the treatment along the at least one treatment line is not interrupted by the cut of the cutting line. In particular, at edges of the filter medium web a precise extension of the at least one cutting line can be realized in this way. Advantageously, the filter medium web can be correspondingly formed in the filter element, in particular folded or closed circumferentially.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in the drawing, the description, and the claims in combination expediently also individually and combine them to meaningful further combinations.

FIG. 1 shows an isometric illustration of a cutting apparatus with an ultrasonic welding device for welding and a disk cutting device for cutting a multi-layer filter medium web.

FIG. 2 shows a detail view of the cutting device of FIG. 1 in the area of the ultrasonic welding device and the disk cutting device.

FIG. 3 a cross-section of the detail view of FIG. 2 along the cut surface III in the area of the ultrasonic welding device.

In the Figures, same components are identified with same reference characters.

PREFERRED EMBODIMENTS OF THE INVENTION

Figure 4:
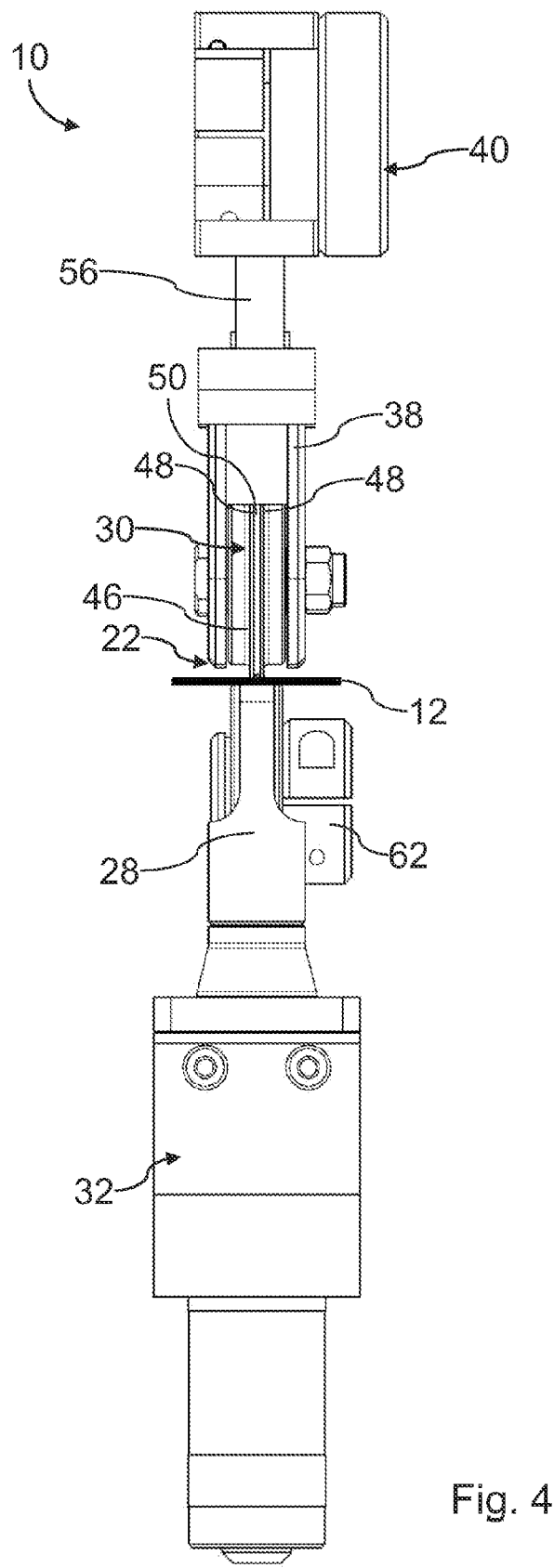
FIG. 4 is a cross-section of the cutting device of FIG. 1 in the viewing direction onto the ultrasonic welding device.

In FIGS. 1 through 4, a cutting apparatus 10 is shown in different perspectives and detailed views. The cutting apparatus 10 serves for welding of a total of four layers 16 of a multilayer filter medium web 12 along two welding seams 18 and for subsequent cutting of the filter medium web 12 along a cutting line 14 which is located between the two welding seams 18.

With the cutting apparatus 10, the filter medium web 12 is separated into filter medium sections 20 which later on are processed to a filter element in a way not of interest in this context. The welding seams 18 form the edges of the filter medium sections 20. The filter medium sections 20 can be folded and/or circumferentially closed in the filter element. The filter medium sections 20 can be used in filter elements of different configurations, for example, round filter elements or flat filter elements. The filter elements can be used for filtration of fluids, for example, air, water, oil, fuel or urea solution. They can be used in internal combustion engines of motor vehicles or different kinds of internal combustion engines, for example, industrial motors. The filter elements can also be used outside of automotive technology.

The cutting apparatus 10 comprises an ultrasonic welding device 22 and a disk cutting device 24. The filter medium web 12 is conveyed for cutting and welding in a conveying direction 26 through the cutting apparatus 10. The ultrasonic welding device 22 is located, viewed in the conveying direction 26, functionally in front of the disk cutting device 24. The filter medium web 12 is first welded along the welding seams 18 and subsequently is cut by the disk cutting device 24 along the cutting line 14.

The ultrasonic welding device 22 comprises a sonotrode 28, in FIGS. 1 through 4 below the filter medium web 12, and a rotating anvil 30, above the filter medium web 12, as an abutment for the sonotrode 28. As an example, the sonotrode 28 is embodied as a so-called rectangular stepped sonotrode with two slots. A top side of the sonotrode 28 which is facing the rotating anvil 30 acts as a welding surface. The welding surface is rectangular and extends with its long side in the conveying direction 26.

Figure 5:
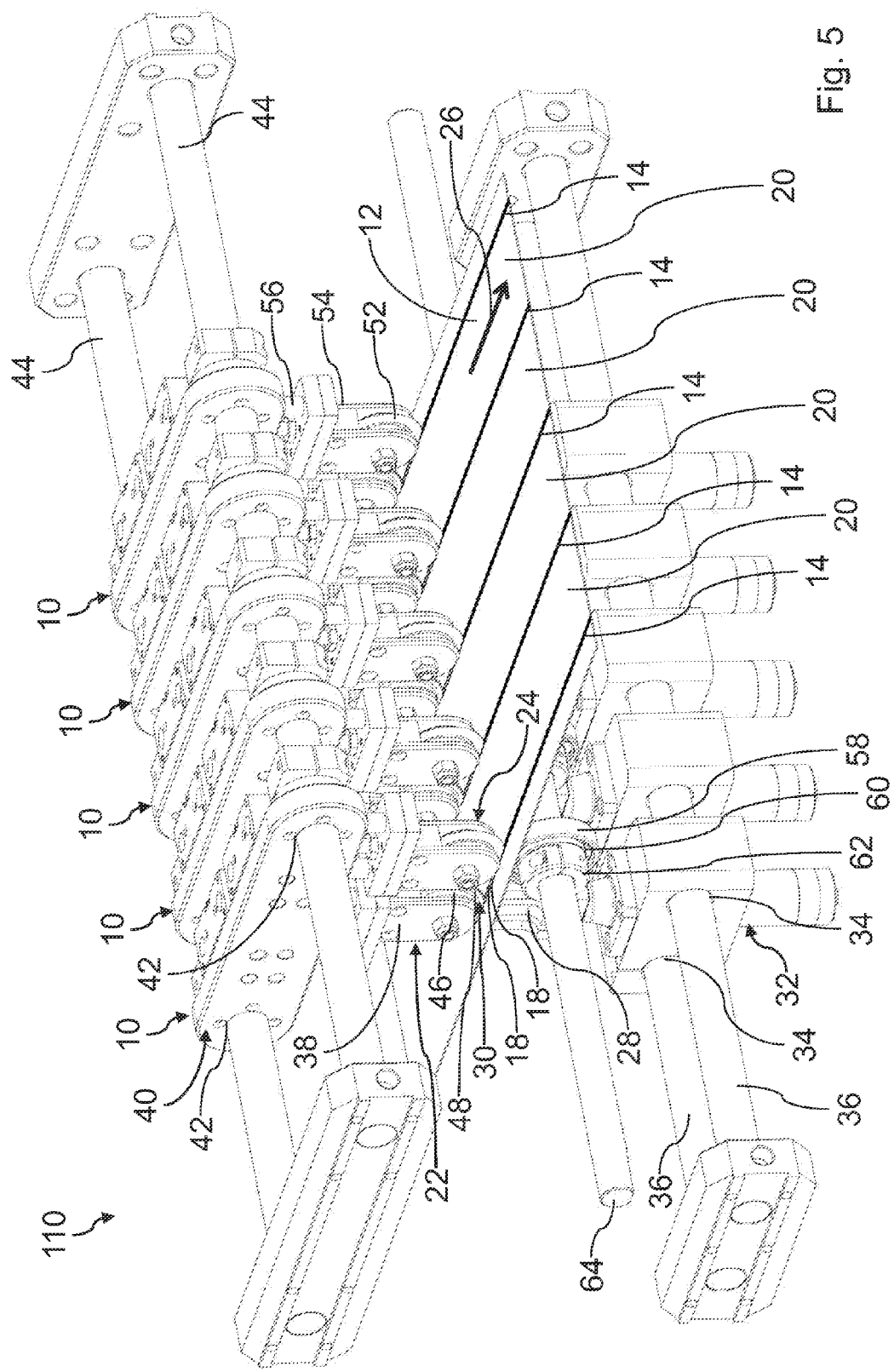
FIG. 5 shows an arrangement of five cutting devices according to the cutting device of FIGS. 1 through 4 arranged adjacent to each other.

The sonotrode 28 is attached on the side which is facing away from the rotating anvil 30 to a lower holding device 32. The lower holding device 32 has two axle receptacles 34 in the form of circular cylindrical through holes whose center axis extends perpendicular to the conveying direction 26 and extends horizontally in the normal mounted position of the cutting apparatus 10. Through the axle receptacles 34 a lower holding axle 36 extends, respectively, on which the lower holding device 32 is arranged so as to be axially slidable. In FIG. 5, the lower holding axles 36 are shown for a cutting assembly 111 in which five identical cutting devices 10 are positioned adjacent to each other. By movement of the lower holding device 32 on the lower holding axles 36, the position of the ultrasonic welding device 22 can be changed.

The rotating anvil 30 has the shape of a cylinder roller. It is rotatably supported about its center axis in a roller holder 38. The center axis of the rotating anvil 30 extends perpendicularly to the conveying direction 26 and horizontally. It extends thus parallel to the center axes of the axle receptacles 34 and the lower holding axles 36. The roller holder 38 is attached with the side facing away from the sonotrode 28 to an upper holding device 40. The upper holding device 40, similar to the lower holding device 32, has two axle receptacles 42 in the form of circular cylindrical through holes through which an upper holding axle 44, shown in FIG. 5, is extending, respectively. The upper holding device 40 is movably arranged on the upper holding axles 44. In this way, the position of the upper holding device 40 and thus of the rotating anvil 30 can be changed.

The rotating anvil 30 has on its radial outer circumferential side an annular projection 46 which extends circumferentially and is shown in detail in FIG. 3. The annular projection 46 is located, viewed axially relative to the center axis, approximately at the center of the rotating anvil 30. The annular projection 46 extends in radial direction outwardly. In the area of the axial outer edges of the annular projection 46 two anvil webs 48 are formed. The anvil webs 48 extend in radial direction and are continuous in circumferential direction, respectively. The two anvil webs 48 are separated from each other by a circumferentially extending recess 50. For a correctly adjusted cutting apparatus 10, the anvil webs 48 are positioned, viewed axially to the center axis of the rotating anvil 30, within the welding surface of the sonotrode 28. This is shown in particular in FIG. 3. The two anvil webs 48 form thus a counter abutment for the sonotrode 28, respectively, so that the layers 16 of the filter medium web 12 can be welded along the two weld seams 18. The position and shape of the welding seams 18 are therefore defined by the anvil webs 48. Upon conveyance of the filter medium web 12 in the conveying direction 26, the rotating anvil 30 is rolling on the filter medium web 12 so that the two parallel welding seams 18, each continuous, are produced. The anvil webs 48 acts thus as treatment elements for treating, i.e., welding, the filter medium web 12 along the treatment lines, i.e, the welding seams 18.

The disk cutting device 24 has a disk cutter 52 which is rotatably supported in an upper knife holder 54 about a center axis of the disk cutter 52. The center axis of the disk cutter 52 extends parallel to the center axis of the rotating anvil 30, i.e., perpendicular to the conveying direction 26 and horizontal. The upper knife holder 54 is attached to the upper holding device 48 and is slidable together with the latter on the upper holding axles 44.

The roller holder 38 and the upper knife holder 54 are each connected by adjustable adjustment means 56 with the upper holding device 40. By means of the adjusting means 56 the upper knife holder 54 and the roller holder 38 can each be adjusted in regard to their vertical position, i.e., with regard to their spacing to the sonotrode 28 and to a counter cutting roller 58.

A circumferentially extending blade of the disk cutter 52 is located, viewed in the conveying direction 26, between the two anvil webs 48. The filter medium web 12 is cut between the two welding seams 18 along the cutting line 14. The cutting line 14 is located outside of the weld seams 18.

On the side of the filter medium web 12 which is opposite to the disk cutter 52, the disk cutting device 24 has a counter cutting roller 58 which forms a counter abutment for the disk cutter 52. The counter cutting roller 58 is supported by means of a roller bearing 60 on a holding ring 62. A center axis of the counter cutting roller 58 and of the ball bearing 60 extends parallel to the center axis of the disk cutter 52, i.e., horizontal and perpendicular to the conveying direction 26. The holding ring 62 is slidably arranged on a central holding axle 64 which is shown in FIG. 5. Thus, the position of the counter cutting roller 58 can be accordingly changed. The central holding axle 64 extends parallel to the lower holding axles 36 and the upper holding axles 44.

The center axis of the counter cutting roller 58 is located in the illustrated embodiment in perpendicular direction below the center axis of the disk cutter 52. It can also be arranged so as to be displaced relative to the latter. The welding surface of the sonotrode 28 is located approximately at the same level as the upper circumferential side of the counter cutting roller 58. The filter medium web 12 is guided in horizontal orientation through the ultrasonic welding device 22 and the disk cutting device 24.

In the cutting assembly 111 illustrated in FIG. 5, five identical cutting devices 10 are arranged adjacent to each other. With the cutting devices 10 it is thus possible to weld the filter medium web 12 along ten welding seams 18 and cut it along five cutting lines 14 in a single working step. Accordingly, four filter medium sections 20 can be cut and welded at their edges in a single working pass.

While specific embodiments of the invention have been shown and described in detail to illustrate the inventive principles, it will be understood that the invention may be embodied otherwise without departing from such principles.

What is claimed is:

1. A method for manufacturing a filter element for filtration of a fluid, the method comprising:
   providing at filter medium sheet having a plurality of flat filter medium layers stacked face to face upon each other forming a multilayer filter medium sheet;
   providing a cutting apparatus having
   a welding device arranged on a first side of the filter medium sheet and a complimentary anvil arranged on a second side of the filter medium sheet; first and second holding device,
   wherein the welding device and anvil are each slidable in a traverse direction relative to a conveying direction of the filter medium sheet;

wherein the anvil has at least two anvil webs spaced apart in the traverse direction;

providing a cutting device on the first or second side of the filter medium sheet, arranged downstream of the welding device, wherein the cutting device is mounted to move in unison with the welding device or anvil;

aligning the welding device and anvil in the traverse direction to abut the welding device onto the anvil directly through the filter medium sheet, conveying the filter medium sheet in the conveying direction between the first and second holding device;

welding layers of the filter medium sheet together along at least two spaced apart welding seams extending in the conveying direction, spacing of the at least two welding seams determined by the traverse spacing of the at least two anvil webs;

cutting the filter medium sheet in the conveying direction between the at least two welding seams to separate the filter medium sheet into multiple welded filter medium sections each having at least one welding seam; and arranging or circumferentially closing at least one of the filter medium sections to produce the filter element.

2. The method according to claim 1, further comprising connecting the layers to each other along the at least one welding line.

3. The method according to claim 1, wherein the step of welding is carried out before the step of cutting.

4. A method for manufacturing a filter element for filtration of a fluid, the method comprising:

providing at filter medium sheet having a plurality of flat filter medium layers stacked face to face upon each other forming a multilayer filter medium sheet;

providing a cutting apparatus having
  a first holding device; and
  a second holding device;
  wherein the first and second hold device are each slidable in a traverse direction relative to a conveying direction of the filter medium sheet;

providing a welding device on one of the first or second holding devices, and a complimentary rotating anvil wheel arranged on a different one of the first and second holding device, wherein the anvil wheel has at least two anvil webs spaced apart in the traverse direction;

providing a cutting disk device on one of the first or second holding devices, and a complimentary counter cutting roller on a remaining one of the first or second holding device, wherein the cutting disk device and cutting roller are mounted to move in unison with the welding device or anvil;

arranging the first holding device at a first side of the filter medium sheet and the second hold device at an opposite second side of the filter medium sheet, such that the filter medium sheet is arranged between the first and second holding devices;

aligning the first and second hold device in the traverse direction to abut the welding device onto the anvil wheel directly through the filter medium sheet, wherein aligning the first and second hold device also aligns the cutting disk device onto the counter cutting roller and positions the cutting disk device to cut the filter medium sheet between the at least two anvil webs;

conveying the filter medium sheet in the conveying direction between the first and second holding device;

welding the filter medium sheet along at least two spaced apart welding seams extending in the conveying direction, spacing of the at least two welding seams determined by the traverse spacing of the at least two anvil webs;

cutting the filter medium sheet in the conveying direction between the at least two welding seams to separate the filter medium sheet into multiple welded filter medium sections; and arranging or circumferentially closing at least one of the filter medium sections to produce the filter element.

* * * * *